United States Patent
Mandal et al.

(10) Patent No.: US 9,166,913 B1
(45) Date of Patent: Oct. 20, 2015

(54) SYSTEMS AND METHODS FOR BALANCING MAX-MIN FAIRNESS AND THROUGHPUT OBJECTIVES IN TRAFFIC ENGINEERING

(75) Inventors: Subhasree Mandal, San Jose, CA (US); Arjun Singh, Mountain View, CA (US); Emilie Jeanne Anne Danna, Mountain View, CA (US)

(73) Assignee: Google Inc., Mountain View, CA (US)

( * ) Notice: Subject to any disclaimer, the term of this patent is extended or adjusted under 35 U.S.C. 154(b) by 487 days.

(21) Appl. No.: 13/586,393

(22) Filed: Aug. 15, 2012

(51) Int. Cl.
- *G06F 15/173* (2006.01)
- *H04L 12/801* (2013.01)
- *H04W 28/02* (2009.01)

(52) U.S. Cl.
CPC ............. *H04L 47/10* (2013.01); *H04L 47/29* (2013.01); *H04W 28/02* (2013.01)

(58) Field of Classification Search
CPC ......... H04L 47/00; H04L 47/10; H04L 47/25; H04L 47/29; H04L 47/525; H04L 47/629; H04W 28/00; H04W 40/02; H04W 40/0289

USPC .......................................................... 709/226
See application file for complete search history.

(56) References Cited

U.S. PATENT DOCUMENTS

2008/0244072 A1* 10/2008 Broberg et al. ............... 709/226

OTHER PUBLICATIONS

Lan et al.; "An Axiomatic Theory of Fairness in Network Resource Allocation"; Mar. 14-19, 2010; Accessed online on Dec. 12, 2014 at http://ieeexplore.ieee.org/stamp/stamp.jsp?tp=&arnumber=5461911.*

* cited by examiner

*Primary Examiner* — Brian J Gillis
*Assistant Examiner* — Austin Moreau
(74) *Attorney, Agent, or Firm* — Edward A. Gordon; Foley & Lardner LLP

(57) ABSTRACT

Systems and methods are provided for allocating resources of a network among a plurality of traffic demands to optimize fairness and throughput. Fairness constraints and traffic commodity importance can be specified to control allocation.

18 Claims, 8 Drawing Sheets

is referenced rather than included directly.

SYSTEMS AND METHODS FOR BALANCING MAX-MIN FAIRNESS AND THROUGHPUT OBJECTIVES IN TRAFFIC ENGINEERING

FIELD OF THE DISCLOSURE

The present disclosure relates generally to traffic engineering in networking systems, and, more particularly, to balancing throughput and efficiency with fairness in bandwidth allocation.

BACKGROUND

In a communication network, users may establish connections between a source node and a destination node via a flow of data that is transferred through the network over one or more network paths. The data communicated over one or more connections constitutes traffic over the network. A traffic demand in the network between the source node and the destination node is represented by a commodity. A network path for a commodity between the source and destination nodes may be defined by a set of nodes (the source-destination node pair and any intermediate nodes) interconnected by a set of links coupled to the nodes carrying the data flow of the commodity. Each link has a capacity corresponding to the traffic it may carry.

Traffic engineering may be used to decide how to route traffic in a network in order to balance several objectives, including, for example maximizing throughput and efficiency, balancing link utilization across the network, controlling bandwidth allocated to competing flows in a fair manner, minimizing latency and ensuring reliable operations when traffic patterns change or parts of the network fail. Traffic engineering techniques improve network utilization and can, for example, result in routing significantly more traffic through the network than simple network schemes which may route any traffic on the shortest path.

Allocation of shared resources to different users of a network is a fundamental problem in distributed computing and networking. One accepted principle of traffic engineering is that network resources, such as network capacity, belong to all users and should be shared among the users in a fair and non-discriminatory way. Another accepted principle is that a network operator will strive to maximize throughput by allocating bandwidth to maximize the use of network resources. These two principles have conflicting goals, however, the user must be satisfied with the fairness of network allocation, and the network operator must also be satisfied that the network resources are being maximally utilized.

One of the goals of traffic engineering is to achieve a trade-off between fairness and throughput (or efficiency) so that both network users are satisfied with bandwidth allocation and a network operator is satisfied that the network resources are being utilized. Accordingly, systems and methods for balancing these two principles, fairness and throughput, are described herein.

SUMMARY

One aspect is directed to a method and system for allocating resources among a plurality of commodities in a network comprising a plurality of network nodes. The method and system include using a server to determine a max-min fairness allocation using a binary and linear search for the plurality of commodities, receive a fairness degradation bounding for each respective commodity of the plurality of commodities, determine an optimal throughput for the plurality of commodities in the network, calculate a network allocation for routing traffic associated with each of the plurality of commodities based on the optimal throughput, the max-min fair allocation, and the fairness degradation bounding, and allocate the calculated network allocation for each of the plurality of commodities.

Another aspect is directed to a method and system for fairly allocating shared resources among a plurality of users, including receiving a selectable tradeoff between efficiency and fairness, determining a max-min fairness allocation for the plurality of users using a binary and linear search, determining an optimal efficiency for the plurality of users of the shared resources, calculating a resource allocation for each of the plurality of users based on the selectable tradeoff, the max-in fairness allocation and the optimal efficiency, and allocating the calculated resource allocation for each of the plurality of users.

BRIEF DESCRIPTION OF THE DRAWINGS

The accompanying drawings, which are incorporated in and constitute a part of this specification, illustrate an implementation of the disclosure and, together with the description, explain the disclosure.

DETAILED DESCRIPTION

The following detailed description refers to the accompanying drawings. The detailed description does not limit the disclosure.

Implementations consistent with the principles of the disclosure relate to traffic engineering applications in networking systems. Systems and methods are provided for allocating resources of a network among a plurality of commodities by balancing fairness and network throughput. Balancing throughput and fairness objectives may be achieved using linear programming which can, for example, allow the network operator to control the fairness/throughput balance trade-off by establishing bounds for fairness degradation for a commodity compared to a fair solution, such as a max-min fair solution or throughput degradation compared its optimal throughput.

Although calculating max-min fairness is known, (described below), it can be difficult to determine quickly. Using linear programming to determine max-min fairness increases the calculation speed as well as allows flexibility for a network operator to establish tradeoff settings for fairness and throughput.

The methods described herein may be used to decrease the number of steps needed to solve for fairness, (as compared to conventional max-min fairness solutions), which can be useful, for example, when access rates are limited, for rerouting traffic when demands or network topology change, and for providing an optimal solution for current data.

In some aspects, the algorithms may be used to determine appropriate network allocations for commodities when some commodities require a higher quality of service. The algorithm can also be used when commodities are aggregated or when users value bandwidth with diminishing returns: piecewise linear functions for commodities. In addition, the network operator can control the fairness/throughput trade-off by specifying a level of fairness, for example, as compared to the max-min fair (or other fair) solution, or to set a throughput degradation compared to an optimal throughput. The trade-off can also be analyzed in view of the contribution of each commodity.

Figure 1:
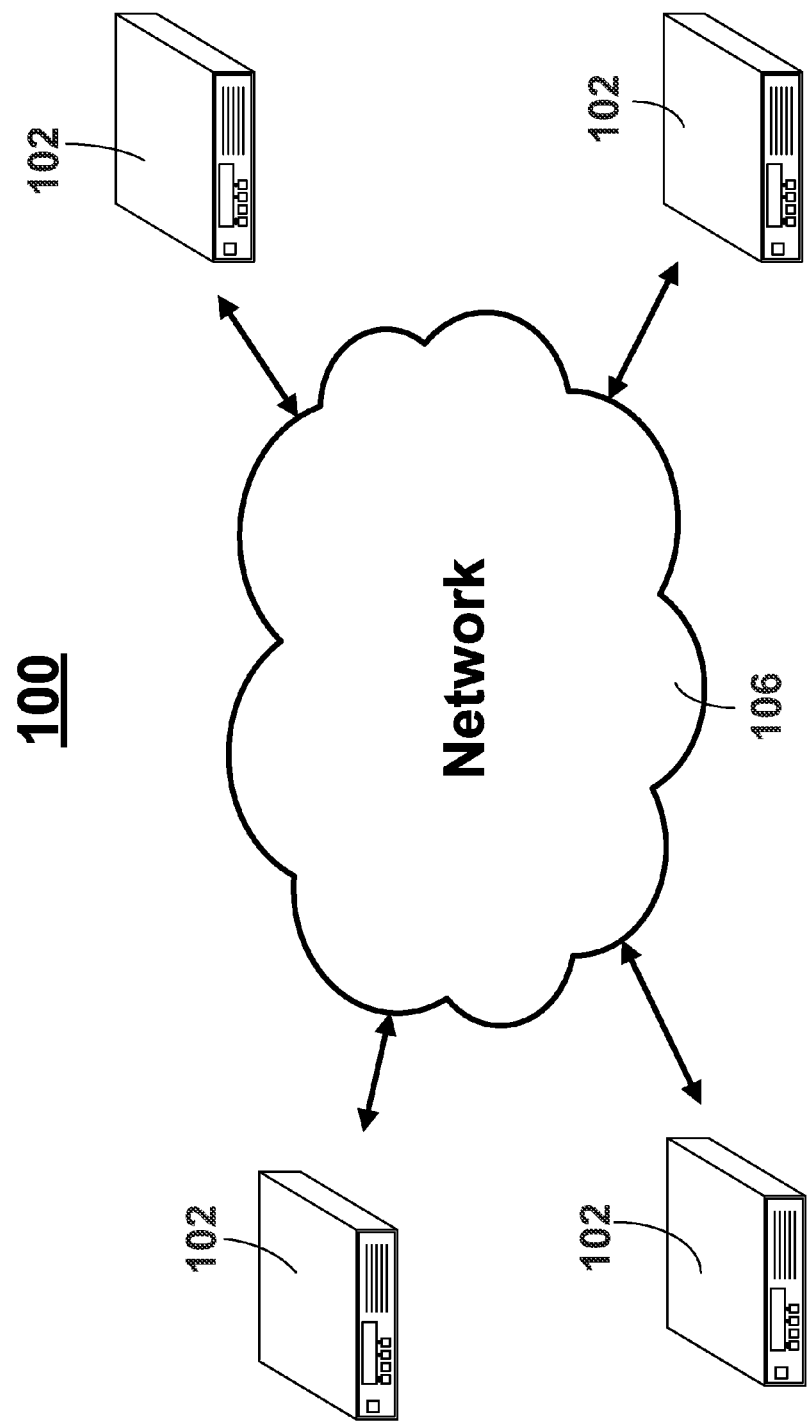
FIG. 1 is a diagram of an exemplary system in which concepts consistent with the principles of the disclosure may be implemented.

The algorithms described herein may be applied to a system including network elements communicating through a network. An exemplary system 100 is shown in FIG. 1. FIG. 1 shows a block diagram depicting network elements communicating through a network, according to an illustrative implementation of the disclosure. System 100 may allow multiple network nodes 102 to connect via a network 106. For example, network nodes 102 may communicate information with each other via network 106. Network nodes 102 may include servers, routers, switches, gateways, network links, client devices, mobile devices, or any other receiver, transmitter, and/or transceiver circuitry capable of providing information to be routed through network 106. Network 106 may include any combination of network links, including, without limitation, digital subscriber lines, ISDN network links, Ethernet links, wireless links, fiber optic links, frame relay network links, asynchronous transfer mode (ATM) network links, or virtual private network (VPN) links. Network 106 may route information through a number of routers, network links, or network nodes within network 106.

The algorithms described herein may be applied to a typical network. The network 106 may be specified by its set of nodes, links and link capacities. The traffic to be routed in the network may be specified by a set of commodities, each with a source, a destination and a demand—which may be the upper bound on the demand access rate. In addition, bandwidth allocation for each commodity may be specified from zero to the upper bound on its access rate, as well as how to route the commodity, which is determined using methods described herein. The bandwidth allocated through each network node and through each network arc is configured through a server which may include a processor and control circuitry capable of performing the steps described herein. Processes and operations performed by the network, including bandwidth allocations, may be implemented using the server. The commodity may be routed in split paths which include a set of paths and the bandwidth allocated on each path. The split paths, or splits, are the distribution of the bandwidth allocated to each commodity among its possible paths, and may be determined according to the methods described herein.

Figure 2:
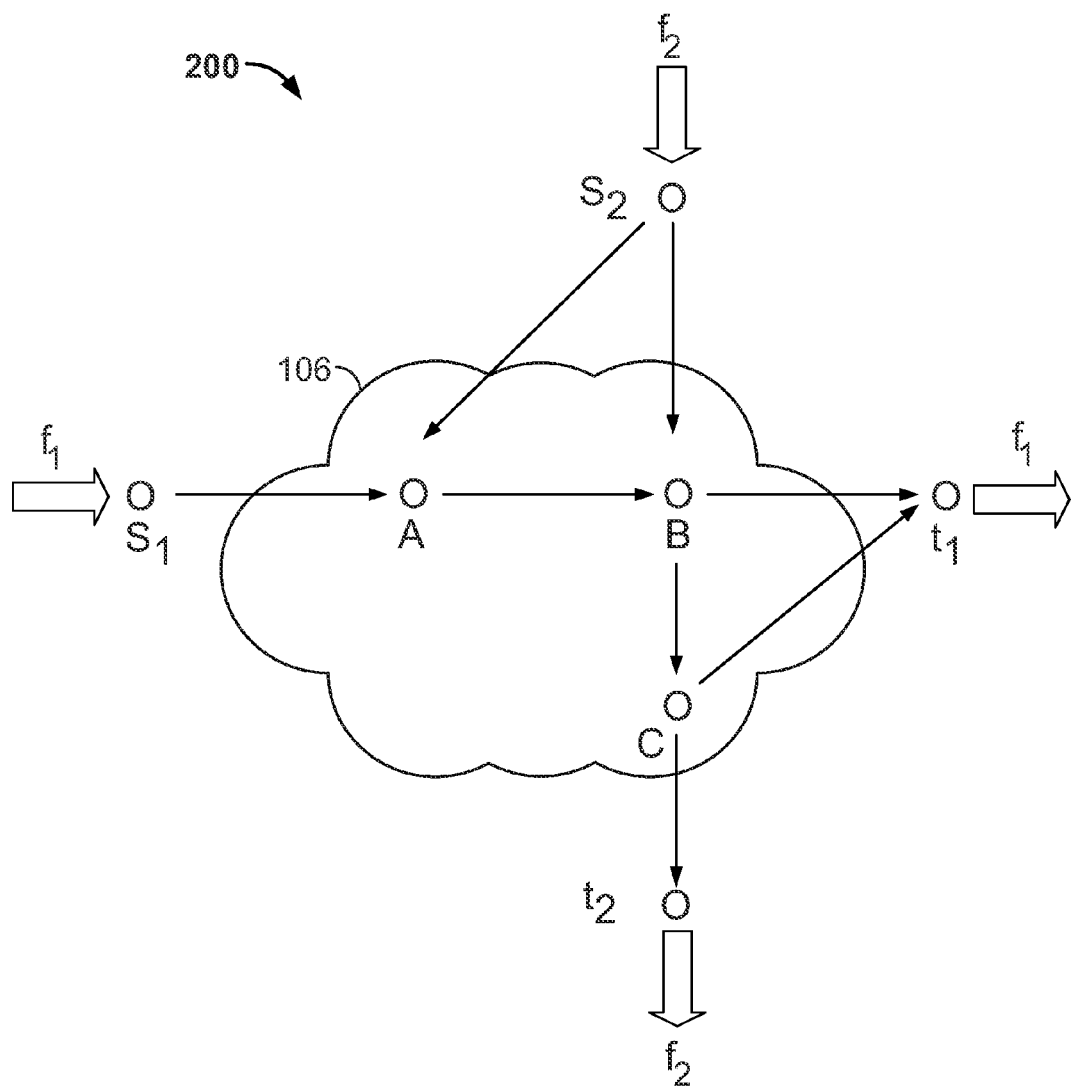
FIG. 2 is a diagram of an exemplary network in which concepts consistent with the principles of the disclosure may be implemented.

FIG. 2 is a diagram of an exemplary network 200 in which concepts consistent with the principles of the disclosure may be implemented. System 200 may be used by multiple users to connect via a network 106. Network 106 may route information through a number of routers, such as routers A, B, and C.

System 200 may include multiple edge nodes, such as source nodes $s_1$, $s_2$ and destination nodes $t_1$, and $t_2$, located at the edge of network 106. In some implementations, the edge nodes may be implemented in receiver, transmitter, and/or transceiver circuitry capable of exchanging data with network 106.

Each of the routers and edge nodes may include routing and processing circuitry for receiving and/or transmitting data. In one implementation, network 106 may be implemented as an Asynchronous Transfer Mode (ATM) network and each of routers A, B, and C and edge nodes $s_1$, $s_2$, $t_1$, and $t_2$ may be connected to one or more control nodes (not shown). These control nodes may correspond to resource management cells that provide feedback, e.g., to source nodes in response to fluctuations in available resources within the network. Two commodities and three routers are illustrated for simplicity. In practice, there may be more routers and/or connections.

A connection between a source node and a destination node (and the traffic demand associated with the connection) will be referred to herein as a commodity. In this disclosure, a commodity and a traffic demand associated with the traffic demand may be used interchangeably. In network 106, a first commodity i=1, representing a first traffic demand, is routed between a source node $s_1$ and a destination node $t_1$. The routing is done by transferring a commodity data flow $f_1$ through communication network 106 over one or more network paths p. A network path for a commodity between the source and destination nodes is defined by a set of nodes (the source-destination node pair and any intermediate nodes) interconnected by a set of links coupled to the nodes carrying the data flow of the commodity. Each link has a capacity corresponding to the traffic carried by the link. The capacity can be associated with bandwidth, effective bandwidth, link quality, or any suitable link characteristic. For simplicity of illustration, all links of system 200 are set to 1. This is exemplary and it should be appreciated that any capacity measure or value can be used.

In traffic engineering, there are several variants of fairness measures. These include max-min fairness (which provides the strictest measure of fairness), proportional fairness (which provides a trade-off between fairness and efficiency), and a-fairness (which generalizes both fairness and efficiency measures). In max-min fairness allocations, network resources may be allocated in order of increasing demand. Generally speaking, low-traffic commodities may be given all the capacity they require, while high-traffic commodities evenly split the remaining capacity of the network. In practice, the max-min fairness strategy first maximizes the smallest allocation among all commodities, it then maximizes the second smallest allocation subject to the first maximized smallest allocation, and so on. Network allocation is considered to be max-min fair if, in order to increase the flow allocated to a commodity, a flow allocated to a commodity with an equal or less flow would have to be decreased. An underlying property of the max-min fair solution is a leximin maximal solution, which is as follows: maximize the lowest allocation with a linear program, identify the commodities that do not get more than this allocation in any solution and fix their allocation to this level, then iterate to maximize the second lowest allocation, etc., until all allocations are fixed. The difficulty in finding the max-min fair solution may lie in identifying, at each step, the commodities whose allocations are to be fixed.

Figure 3:
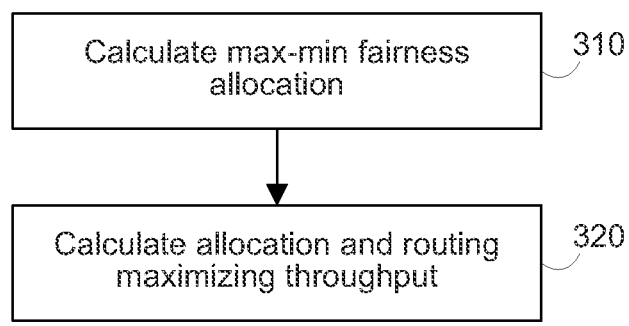
FIGS. 3-5B are flow charts illustrating an exemplary process according to some implementations of the disclosure.

Accordingly, methods for finding a max-min fair solution and balancing throughput may be achieved following the process 300 shown in FIG. 3. Process 300 may be implemented in one or more components of a network communications system (e.g., system 100 of FIG. 1). This can be done in a distributed way, e.g., using routing and processing circuitry of various edge nodes and routers. At 310 max-min fairness allocation is calculated. Max-min fairness may be calculated using the server using a standard solution for max-min fairness, or via an improved algorithm for calculating max-min fairness, both discussed herein.

A standard solution for max-min fairness presented in Table 1 may be calculated using the following algorithm where C is the set of all commodities, each commodity d may have a bandwidth demand $D_d$ which represents the upper bound of its network access rate, U is the set of commodities whose allocation has not been fixed yet, $Z_i$ is the set of commodities whose allocation has been fixed at step i.

TABLE 1

Standard Solution For Max-Min Fairness

Initialization: U ← C, i ← 0
while U ≠ ∅ do
  Maximize the i-th smallest allocation: solve $P_i$,
  its optimal value is $t_i$
  Perform non-blocking test: $Z_i$ ← set of commodities
  in U that cannot be allocated more than $t_i$ in any
  solution.
  Fix the allocation of commodities in $Z_i$ to $t_i$
  U ← U \ $Z_i$
  i ← i + 1
end while A problem $P_i$ may be calculated using the following linear program:

max t such that $$X_d \leq D_d \forall d \in C \quad (1)$$

$$t - X_d \leq 0 \forall d \in U \quad (2)$$

$$t_k - X_d \leq 0 \forall d \in Z_k \forall k = 0 \ldots i-1 \quad (3)$$

$$X \in F \quad (4)$$

where $X_d$ is the total bandwidth allocated to commodity d. In the above linear program, set (1) enforces that each commodity is allocated no more than its demand, set (2) enforces that the commodities that have not been fixed yet get an allocation that is greater than the minimum allocation t, which is maximized in the objective, set (3) enforces that the commodities that have been fixed in all previous steps are fixed at the levels $t_k$ previously computed, and set (4) enforces that there is a feasible flow corresponding to the vector of allocations $X = (X_d)_{d \in C}$. Some standard ways to model feasibility for a multi-commodity flow include arc formulation and path formulation.

In the standard algorithm for max-min fairness, any blocking commodity (or commodities) generally cannot be allocated more throughput because the commodities are saturated, meaning that their demand is equal to the allocation level $t_k$, or an edge in the network is saturated. In the standard algorithm, the allocation level t may be increased iteratively in a linear way to address either situation.

Figure 4:
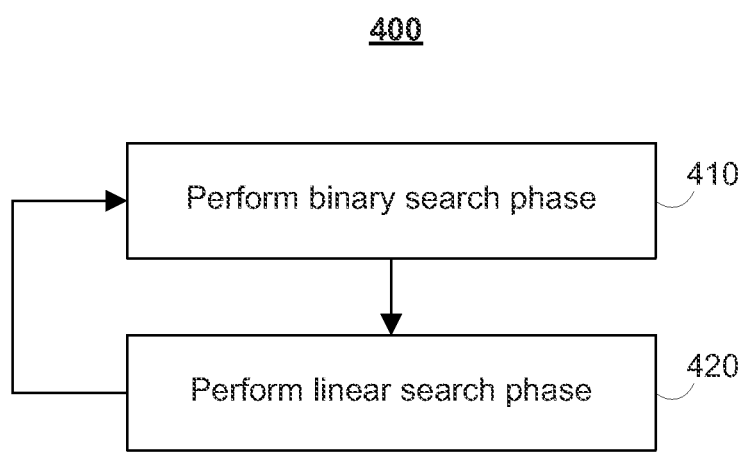

Max-min fairness may also be calculated using a binary then linear search technique, following process 400 of FIG. 4. In the binary search phase, at 410 saturated commodities of the network may be identified. At step 420, a linear search phase is performed to find a saturated network edge, for example, but finding the saturated commodity with the highest demand before the next edge is saturated. The binary and linear search algorithm for identifying the saturated commodities is outlined in sets 5-9, below, and the binary search phase is explained in more detail below. For speed and numerical stability, binary search is conducted on the demand indices (after sorting) not the demand values. The binary and linear search algorithm is presented in Table 2. The binary search phase for max-min fairness is presented in Table 3. Duplicate demands are eliminated in order to avoid degenerate binary steps. At the end of each binary search phase, $t_{feas} = d_{id_{feas}}$ is equal to the highest saturated demand level such that no additional edge is saturated.

TABLE 2

Binary and Linear search algorithm for max-min fairness

Initialization: U ← C
while U ≠ ∅ do
  Binary search phase (see Table 3): find the
  saturated commodity with the highest demand so that
  no additional edge is saturated and fix relevant
  commodities. One linear iteration as in the standard
  algorithm (see Table 1): find the next allocation
  level $t_i$ dictated by the next saturated edge and fix
  relevant commodities.
end while The Binary search phase for max-min fairness may be solved using the following:

TABLE 3

Binary search phase for max-min fairness

Initialization: $id_{feas}$ ← last known feasible index
Initialization: find first value of id_infeas with
exponential search
Choose $id_{current}$ between $id_{feas}$ and $id_{infeas}$
while $id_{infeas}$ − $id_{feas}$ > 0 do
  $t_{current}$ ← $d_{icurrent}$
  Solve $\tilde{P}$ ($t_{current}$): try to allocate up to $t_{current}$ to
  every commodity in U
  if $\tilde{P}$ ($t_{current}$): is feasible then
    $id_{feas}$ ← $id_{current}$
  else
    $id_{infeas}$ ← $id_{current}$
  end if
  $id_{current}$ ← ($id_{feas}$ + $id_{infeas}$) / 2
end while
Fix relevant commodities: Each commodity d ∈ U such that
$D_d \leq t_{feas}$ is fixed to $t_d = \min(t_{feas}; D_d)$
Identify remaining free commodities: U ← U \ {d ∈ C : $D_d \leq t_{feas}$}

Based on the binary and linear search technique, the problem $\tilde{P}(t\_current)$ becomes:
$\tilde{P}(t\_current)$ is the following linear system:

$$X_d \leq D_d \forall d \in C \quad (5)$$

$$\min(t_{current}, D_d) - X_d \leq 0 \forall d \in U \quad (6)$$

$$t_k - X_d \leq 0 \forall d \in Z_k \forall k = 0 \ldots i-1 \quad (7)$$

$$t_d - X_d \leq 0 \forall d \text{ fixed in previous binary phases} \quad (8)$$

$$X \in F \quad (9)$$

Set (6) saturates any commodities with demands less than $t_{current}$ that have not been fixed. Sets (7) and (8) enforce that commodities fixed in all previous linear steps and binary steps are fixed at demand levels previously computed.

In each binary search phase, thanks to the exponential search initialization, the number of iterations of the binary and linear search algorithm is $O(|A_{sat}| + |A_{sat}| \log(|C|/|A_{sat}|))$ where $|A_{sat}|$ is the number of saturated edges. One linear iteration may be executed for each saturated edge. In each binary search phase, the number of iterations is bounded by the logarithm of the number of commodities that are fixed in this binary search phase. Depending on whether the search finishes with a linear or a binary iteration, there are $|A_{sat}|$ or $|A_{sat}|+1$ linear search phases. There are at most $|C|$ commodities to be fixed in binary search phases. The logarithmic function is concave so that the highest number of binary iterations is obtained when edge saturations are evenly spaced and each binary phase fixes $O(|C|/|A_{sat}|)$ commodities in $O(\log(|C|/|A_{sat}|))$ steps.

The number of iterations of the binary and linear search algorithm is $O(|A|+|A| \log(|C|/|A|))$ in the worst case. The logarithmic function is concave so the complexity function is monotonically increasing with $|A_{sat}|$. The highest number of iterations is obtained when the search is divided in the highest number of binary search phases, that is when $|A_{sat}|=|A|$.

When network congestion level is high, many edges are saturated, therefore, repeating many small binary phases may be slow. To deal with such congestion, one binary search phase may be executed followed by a linear search phase. The search phases may continue alternating a binary search phase and a linear phase.

The number of iterations of the binary then linear search algorithm is $O(|C|)$. In some worst case scenarios, the binary search phase does not fix any commodities at the beginning (because no demand can be completely satisfied without saturating an edge) and one commodity is fixed at each iteration of the subsequent linear search.

Figure 5A:
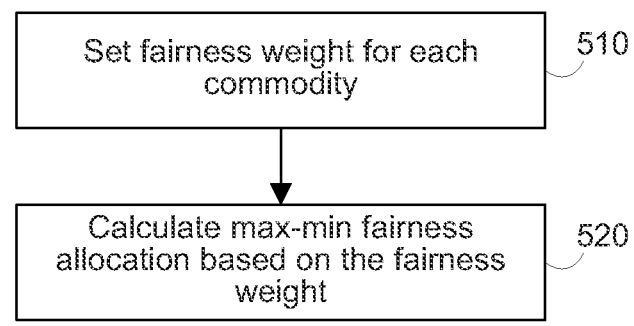

In order to control the impact of max-min fairness, process 500 of FIG. 5A may be followed. Such control may be useful for a network operator. Each commodity may have a fairness weight that may differ by commodity. For example, some commodities may have higher quality of service requirements than other commodities, and so they may be considered more important than other commodities. Such difference may be applied to the fairness algorithm using weights $w_d$ for each commodity. The weight may also be related to a preference for network allocation. The max-min fair solution with this additional weight information may be computed by changing $P_i$ as follows in Table 4.

At 510, a fairness weight may be allocated to a commodity and be received by the server. The fairness weight may be selectable and assigned, for example, by a network operator or user. The weight may indicate a preference for network allocation. A fairness calculation using the weights may be obtained at 520 using the algorithm in Table 4.

TABLE 4

Calculating Fairness with Different Weights For Each Commodity max t such that
$X_d \leq D_d \ \forall d \in C$ (10)
$X_d = w_d r_d \ \forall d \in C$ (11)
$T - r_d \leq 0 \ \forall d \in U$ (12)
$t_k - r_d \leq 0 \ \forall d \in Z_k \forall k = 0 \ldots i-1$ (13)
$X \in F$ (14)
$r_d \geq 0 \ \forall d \in C$ (15)

The new variable $r_d$ indicates the level for each commodity d (11) and links the level and the allocation for each commodity by taking into account the weight $w_d$. The level is the inverse of a linear utility function with slope $w_d$. The binary search may be changed in the same way.

Fairness may also be controlled by assigning a utility function for each commodity. The utility functions may arise in certain situations. Some examples follow:

Aggregation: commodities with the same source and destination, but possibly different importance weights or other characteristics, can be aggregated in one commodity with a concave piece-wise linear utility function.

Diminishing returns for bandwidth: users often value the first unit of bandwidth more than an additional unit of bandwidth when they already have a satisfactory allocation. This corresponds to a concave utility function. Users can specify this utility function by identifying thresholds of bandwidth they would like to obtain and their associated importance. This leads to piece-wise linear utility functions.

If different forms of utility functions are used (for example logarithmic), the functions can still be approximated with piece-wise linear functions.

Figure 5B:
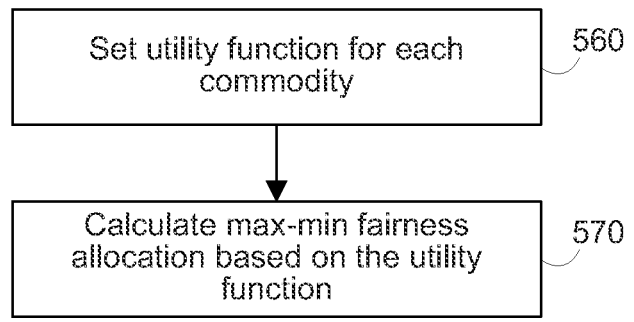

Let the utility function $u_d$ of commodity d be a piece-wise linear function specified by its sets of breakpoints: $\{(t^l, x^l_d), l \in L\}$ FIG. 5B shows a flow 550 for calculating an allocation using a utility function. As shown, at 560, a utility function may be assigned for each commodity. The utility function may be set by a network operator or a user, and may be received by the server. The server, at 570, calculates an allocation based on the utility function.

Figure 6:
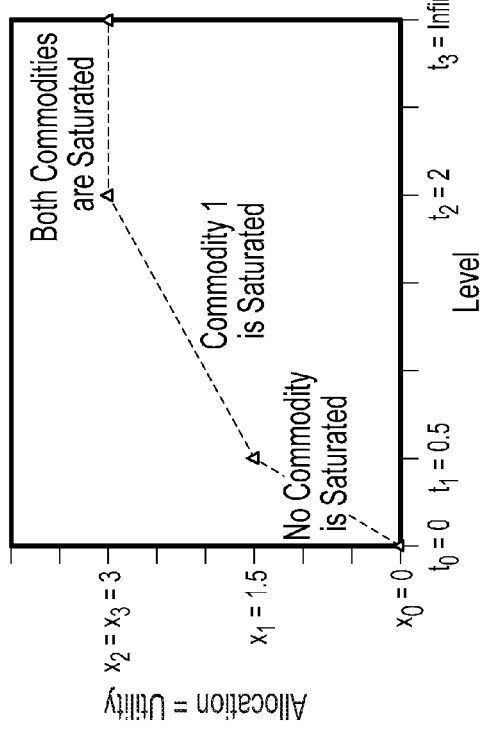
FIGS. 6-10 show experimental results for the processes of FIGS. 3-5B.

An example calculating utility function for a commodity is depicted in Table 5. An example of the utility function is also shown in FIG. 6. Breakpoints can be arbitrarily set so that the breakpoints for all utility functions can have the same t coordinates. The series of linear programs may be modified as follows to handle this non-linearity.

If the interval $[t^l, t^{l+1}]$ is known to be in use, the utility function is a linear function:

$$u_d(t) = x^l_d + \frac{x^{l+1}_d - x^l_d}{t^{l+1} - t^l}(t - t^l)$$

Each linear program $P_i$ may be changed depending on the relevant interval $[t^l, t^{l+1}]$:

TABLE 5

Utility Function for Each Commodity max t such that
$X_d \leq D_d \ \forall d$ (16)
$t - r_d \leq 0 \ \forall d \in U$ (17)

$$X_d = x_{d,l} + \frac{x^{l+1}_d - x^l_d}{t^{l+1} - t^l}(r_d - t^l) \forall d \in U \quad (18)$$

$X_d = u_d(t_k) \ \forall d \in Z_k \forall k = 0 \ldots i-1$ (19)
$X \in F$ (20)
$r_d \geq 0 \ \forall d \in U$ (21)
$t^l \leq t \leq t^{l+1}$ (22)

The above linear program provides commodities that have not been fixed to get a level that is greater than a minimum level t, which is maximized. The utility function is expressed linearly in set (18) which is restricted to the relevant interval for level t in set (22). $u_d(t_k)$ in set (19) corresponds to a constant equal to the utility function $u_d$ computed at value $t_k$.

Each step in the linear program has an additional stopping criterion. Previously, each step of the linear search would terminate by identifying at least one blocking commodity and fixing it at the current level. Using the linear program outlined in Table 5, a step of the linear search may terminate with no blocking commodities. In this case, the stopping criterion is that the upper bound of the level interval has been reached: $t=t^{l+1}$. At the next step, the linear search moves on to the next interval $[t^{l+1}, t^{l+2}]$ and the expression of utility functions in (17) is changed accordingly. This algorithm is shown in Table 6.

TABLE 6

Linear search algorithm for max-min fairness
with piece-wise utility functions

Initialization: U ← C, i ← 0
Initialization of the breakpoint index: l = 0
while U ≠ ∅ do
  Maximize the i-th smallest allocation: solve $P_i$ with
  interval [$t^l$, $t^{l+1}$], its optimal value is $t_i$
  Perform non-blocking test: $Z_i$ ← set of commodities in U
  that cannot be allocated more than $t_i$ in any solution
  if $Z_i \neq \emptyset$ then
    Fix the allocation of commodities in $Z_i$ to $t_i$
    U ← U \ $Z_i$
  else
    Move to the next breakpoint: l ← l + 1
  end if
  i ← i + 1
end while Binary search may also be changed in a similar way by applying it to both the demand values and the breakpoint values $(t^l)_{l \in L}$, ordered in increasing order. At each iteration of the binary search, the formulation of $\tilde{P}$ is changed in the same way as $P_i$ to use the expression of the utility function that depends on the relevant interval [$t^l$; $t^{l+1}$].

Turning again to FIG. 3, an allocation and routing may be calculated at 320 based on maximizing throughput and the max-min fairness. As discussed herein, max-min fairness may be calculated in several ways, preferably using a binary and linear search technique, and may include weights for each commodity and utility functions.

The optimal throughput without any fairness considerations may be obtained by solving the following standard linear program where $T_{opt}$ is the optimal throughput value. ($P_{throughput}$):

$$\max \sum_d X_d$$

such that $$X_d \geq D_d \forall d \in C$$

$$X \in F$$

In order to obtain a trade-off between max-min fairness and throughput, the max-min fair allocation $X^{MMF}$ is computed using the server as described herein. Then, a modification of ($P_{throughput}$) is determined to optimize throughput under fairness constraints as follows. ($P'_{throughput}$) optimizes throughput under (23) so that each commodity gets at least a given fraction $q_{fairness}$ of its fair allocation:
($P'_{throughput}$):

$$\max \sum_d X_d$$

such that $$X_d \leq D_d \forall d \in C$$

$$X \in F$$

$$X_d \geq q_{fairness} X_d^{MMF} \forall d \in C \quad (23)$$

Similarly, the fairness degradation can be specified in an absolute rather than relative manner, by replacing set (23) with the following constraint where $\alpha_{fairness}$ is the largest absolute degradation allowed compared to the fair allocation:

$$X_d \geq X_d^{MMF} - \alpha_{fairness} \forall d \in C \quad (24)$$

Alternatively, ($P''_{throughput}$) may be used to optimize a fraction $q_{fairness}$ of the fair allocation that each commodity is guaranteed to be allocated, under set (25) that the throughput is at least a fraction $q_{throughput}$ of the optimal throughput $T_{opt}$: max $q_{fairness}$ such that $$X_d \leq D_d \forall d \in C$$

$$X \in F$$

$$X_d \geq q_{fairness} X_d^{MMF} \forall d \in C \quad (25)$$

$$\sum_d X_d \geq q_{throughput} T_{opt} \quad (26)$$

$$0 \leq q_{fairness} \leq 1 \quad (27)$$

A similar model may be formulated for an absolute, rather than relative, fairness degradation.

The hybrid approach provides improved control of the impact of fairness, as well as operator control of a tradeoff of fairness and throughput. In choosing a value for $q_{fairness}$ or $\alpha_{fairness}$, the network operator may precisely control the impact on fairness. The network operator can also control the trade-off on fairness or throughput, depending on the criterion that is most important to the operator. The hybrid approach guarantees that any decrease in allocation compared to the max-min fair allocation is bounded by a given factor for all commodities.

Figure 7:
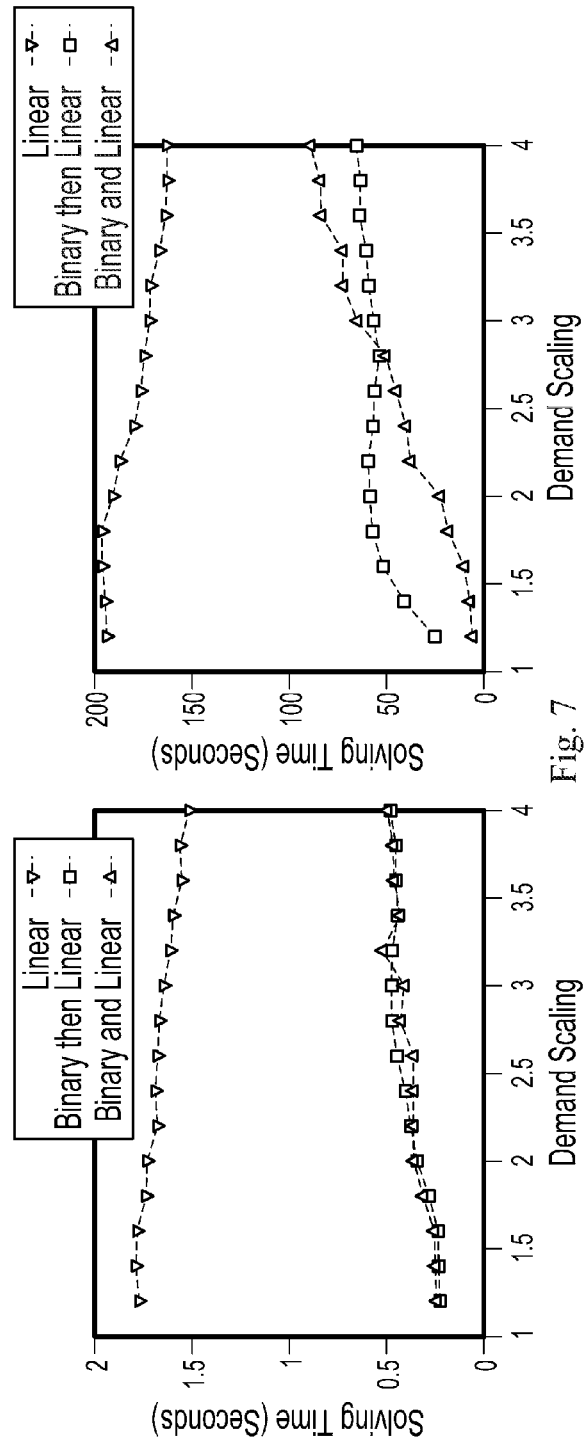
Figure 8:
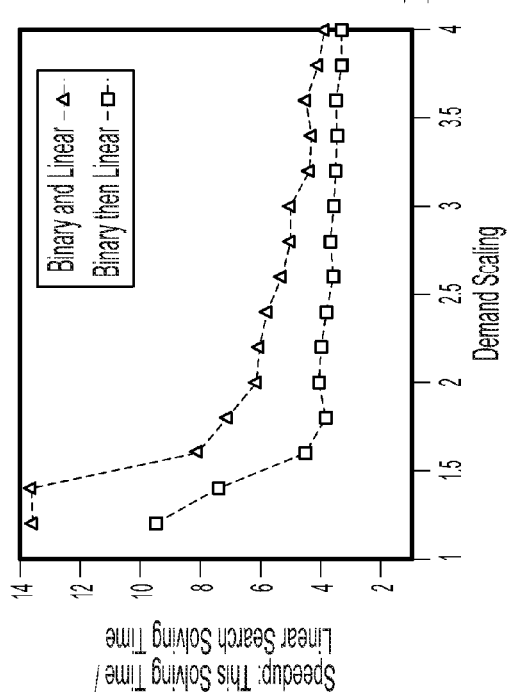

FIGS. 7-8 depict graphs showing experimental results showing the speed solving times using binary and linear search compared to linear and binary then linear, tradeoff between fairness and throughput. As shown in FIGS. 7-8 the improvement in speed of binary and linear search compared to linear search is significant for all demand (congestion) levels.

Figure 9:
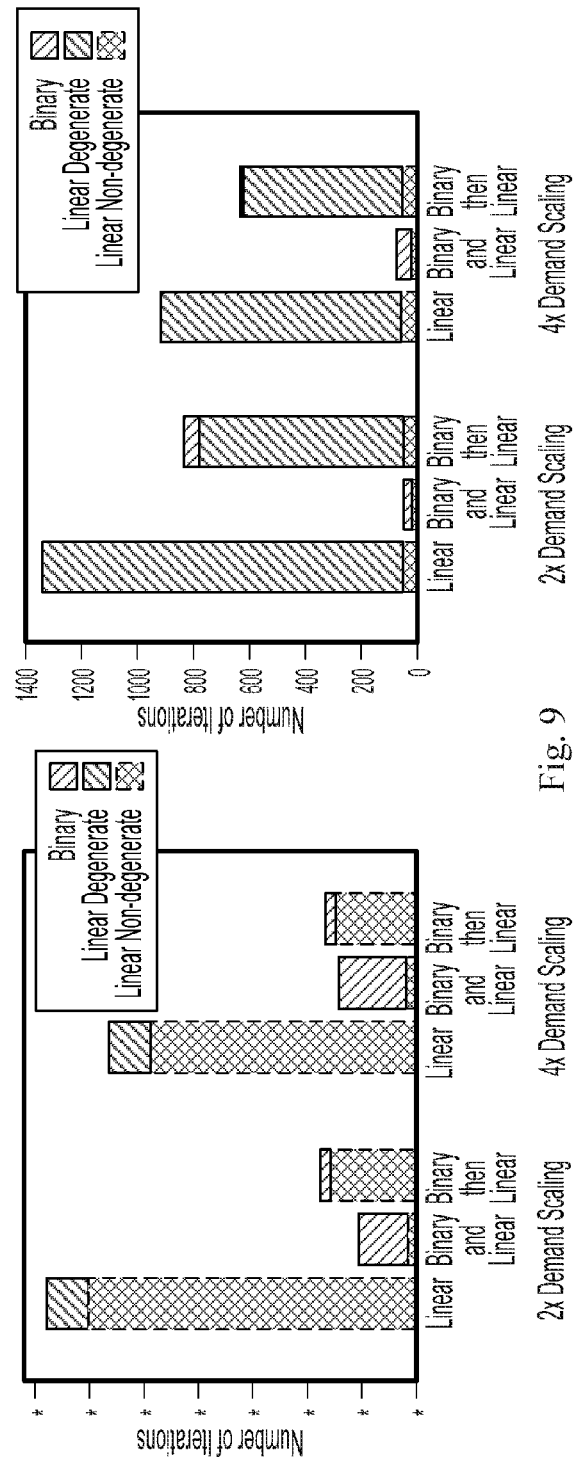

FIG. 9 depict graphs showing the improvement in the number of iterations in computing max-min fairness using linear, binary and linear and binary then linear searching.

Figure 10:
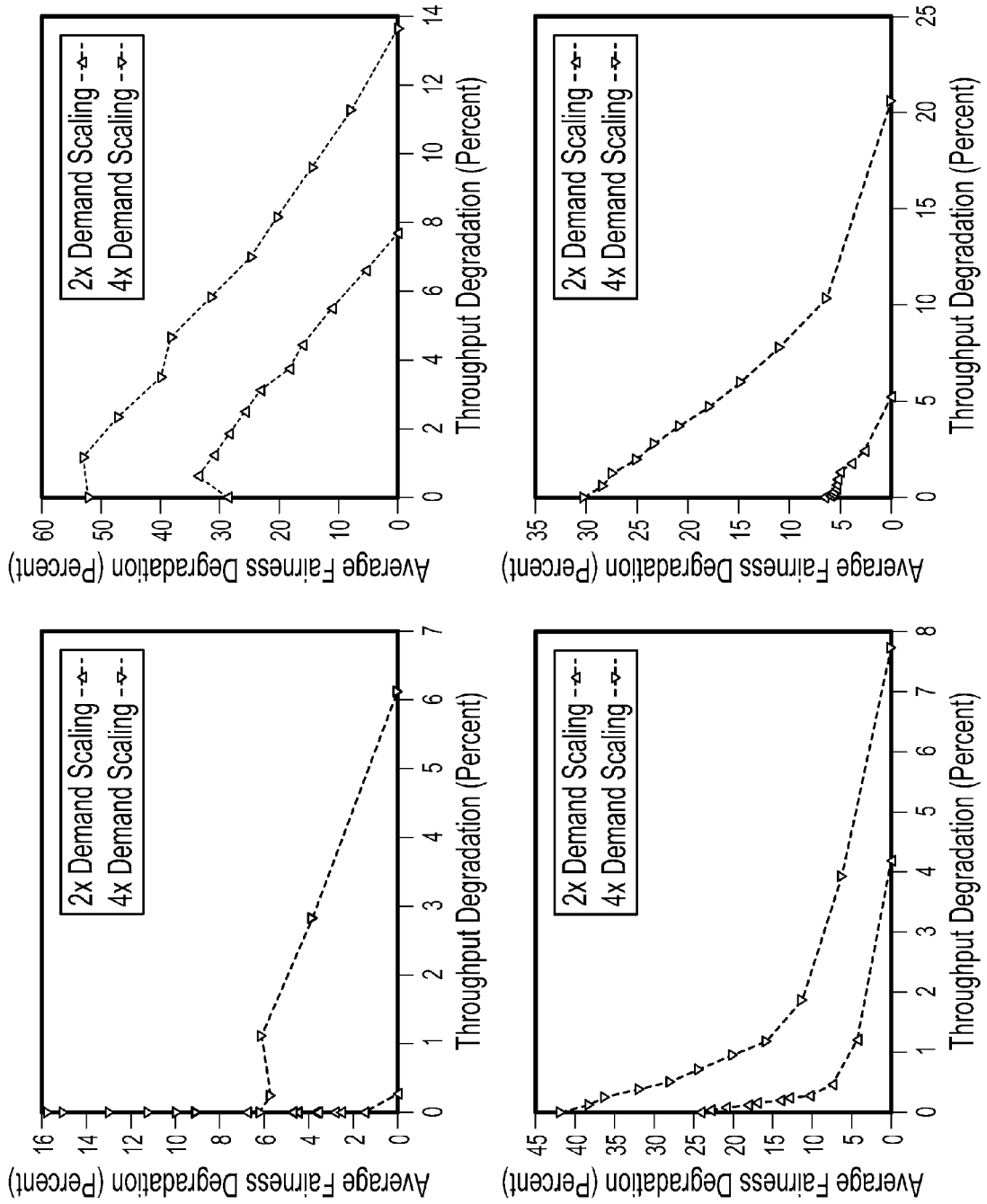

FIG. 10 depict graphs on four different networks showing experimental results for the flexible trade-off between fairness and throughput achieved by the throughput algorithm using the binary and linear search technique for max min fairness. The experiments included values of $q_{fairness}$ ranging from 0.0 to 1.0 in 0.1 increments. $q_{fairness}=0$ is the solution that maximizes throughput without fairness considerations. $q_{fairness}=1$ is the max-min fair solution. Intermediate values of $q_{fairness}$ represent different trade-offs between fairness and throughput.

The foregoing description of exemplary implementations of the disclosure provides illustration and description, but is not intended to be exhaustive or to limit the disclosure to the precise form disclosed. Modifications and variations are possible in light of the above teachings or may be acquired from practice of the disclosure. For example, while series of steps have been described with regard to FIGS. 3-5B, the order of the steps may be varied in other implementations consistent with the disclosure. Moreover, non-dependent steps may be implemented in parallel.

It will also be apparent to one of ordinary skill in the art that aspects of the disclosure, as described above, may be implemented in many different forms of software, firmware, and hardware in the implementations illustrated in the figures. The actual software code or specialized control hardware used to implement aspects consistent with the principles of the disclosure is not limiting of the disclosure. Thus, the operation and behavior of the aspects of the disclosure were described without reference to the specific software code—it being understood that one of ordinary skill in the art would be able to design software and control hardware to implement the aspects based on the description herein.

Further, certain portions of the disclosure may be implemented as "logic" or a "component" that performs one or more functions. This logic may include hardware, such as an application specific integrated circuit or a field programmable gate array, software, or a combination of hardware and software.

No element, step, or instruction used in the description of the disclosure should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method for allocating resources among a plurality of commodities in a network comprising a plurality of network nodes, the method comprising:
    determining, at a server, a max-min fairness allocation for the plurality of commodities by iteratively alternating between a binary search for a saturated commodity and a linear search for a saturated network edge;
    receiving, at the server, a fairness degradation bounding for each respective commodity of the plurality of commodities;
    determining, at the server, a throughput for the plurality of commodities in the network;
    calculating, at the server, a network allocation for routing traffic associated with each of the plurality of commodities based on the throughput, the max-min fair allocation, and the fairness degradation bounding; and
    allocating, at the server, the calculated network allocation for each of the plurality of commodities.

2. The method of claim 1 wherein the fairness degradation bounding comprises a degradation allowed compared to the max-min fairness allocation.

3. The method of claim 1 wherein the fairness degradation bounding is selectable.

4. The method of claim 1 further comprising assigning a utility function to each commodity of the plurality of commodities, wherein the utility function specifies a preference for the network allocation.

5. The method of claim 1 further comprising receiving a weight for each of the plurality of commodities, wherein the weight specifies a preference for the network allocation.

6. A system for allocating resources among a plurality of commodities in a network, the network comprising:
    a plurality of network nodes, wherein the plurality of network nodes are coupled by a set of network links; and
    a server for controlling the allocation of bandwidth over at least one of the network nodes and at least one of the network links, wherein the server comprises a processor configured to:
    determine a max-min fairness allocation for the plurality of commodities by iteratively alternating between a binary search for a saturated commodity and a linear search for a saturated network edge;
    receive a fairness degradation bounding for each respective commodity of the plurality of commodities;
    determine a throughput for the plurality of commodities in the network;
    calculate a network allocation for routing traffic associated with each of the plurality of commodities based on the throughput, the max-min fair allocation, and the fairness degradation; and
    allocate the calculated network allocation for each of the plurality of commodities.

7. The system of claim 6 wherein the fairness degradation bounding comprises a degradation allowed compared to the max-min fairness allocation.

8. The system of claim 6 wherein the fairness degradation bounding is selectable.

9. The system of claim 6 further comprising assigning a utility function to each commodity of the plurality of commodities, wherein the utility function specifies a preference for the network allocation.

10. The system of claim 6 further comprising receiving a weight for each of the plurality of commodities, wherein the weight specifies a preference for the network allocation.

11. A method for fairly allocating shared resources among a plurality of users in a network comprising a plurality of network nodes coupled by a plurality of network links, the method comprising:
    receiving at a server coupled to the shared resources, a selectable tradeoff between efficiency and fairness;
    determining at the server a max-min fairness allocation for the plurality of shared resources by iteratively alternating between a binary search for a saturated network link and linear search for a saturated network edge;
    determining at the server an efficiency for the plurality of users of the shared resources;
    calculating at the server a resource allocation for each of the plurality of users based on the selectable tradeoff, the max-in fairness allocation and the efficiency; and
    allocating at the server the calculated resource allocation for each of the plurality of users.

12. The method of claim 11 wherein the calculating the server resource allocation for each of the plurality of users is further based on a fairness degradation bounding comprising an efficiency degradation allowed compared to the efficiency.

13. The method of claim 11 wherein the calculating the server resource allocation for each of the plurality of users is further based on a utility function for each of the plurality of users specifying a preference for the resource allocation.

14. The method of claim 11 further comprising receiving a weight for each of the plurality of users, wherein the weight specifies a preference for the resource allocation.

15. A system for fairly allocating shared resources among a plurality of users, the system comprising:
    a shared resource comprising a plurality of network nodes, wherein the plurality of network nodes are coupled by a set of network links; and
    a server for controlling the allocation of bandwidth over at least one of the network nodes and at least one of the network links, wherein the server comprises a processor configured to:
    receive a selectable tradeoff between efficiency and fairness;
    determine a max-min fairness allocation for the plurality of shared resources by iteratively alternating between a binary search for a saturated network link and a linear search for a saturated network edge;
    determine an efficiency for the plurality of users of the shared resources;

calculate a resource allocation for each of the plurality of users based on the selectable tradeoff, the max-in fairness allocation and the efficiency; and allocate the calculated resource allocation for each of the plurality of users.

16. The system of claim 15 wherein the processor is further configured to calculate the resource allocation for each of the plurality of users based on a fairness degradation bounding comprising an efficiency degradation allowed compared to the efficiency.

17. The system of claim 15 wherein the processor is further configured to calculate the resource allocation for each of the plurality of users is based on a utility function for each of the plurality of users specifying a preference for the resource allocation.

18. The system of claim 15 wherein the processor is further configured to receive a weight for each of the plurality of users, wherein the weight specifies a preference for the resource allocation.

* * * * *